Sept. 30, 1969 C. L. HABERMEHL ET AL 3,470,392

ELECTRONIC PRESSURE-SENSITIVE SEMICONDUCTOR DEVICE

Filed May 17, 1967

INVENTORS.
CLARK L. HABERMEHL
and JAMES T. NEWELL

H. H. Losche
Attorney

United States Patent Office 3,470,392
Patented Sept. 30, 1969

3,470,392
ELECTRONIC PRESSURE-SENSITIVE SEMICONDUCTOR DEVICE
Clark L. Habermehl, Columbia, Ill., and James T. Newell, Kirkwood, Mo., assignors, by mesne assignments, to the United States of America as represented by the Secretary of the Navy
Filed May 17, 1967, Ser. No. 640,790
Int. Cl. H03k 3/26
U.S. Cl. 307—308 5 Claims

ABSTRACT OF THE DISCLOSURE

A pressure-sensitive semiconductor device having a force actuating plunger with a point contact on the semiconductor material to change the electrical characteristics of the semiconductor output proportional to plunger pressure exerted on the material.

BACKGROUND OF THE INVENTION

This invention relates to pressure-sensitive semiconductor devices and more particularly to pressure-sensitive diodes and transistors.

Recent discoveries have revealed that forces or stresses can be applied to p-n junction semiconductors to change their electrical characteristics as disclosed in the article "Stress-Sensitive Integrated Circuits," by Robert C. Wonson, Electronics, July 12, 1965, pages 81–84. In the prior are cumbersome equipment is used to obtain desired results, as for example, a servomechanism assembly including a motor-generator, a gear reduction train, a synchro control transformer, and a clutch assembly, all of which could be replaced by a light weight, small package device of this invention to accomplish the same results. Other examples of cumbersome equipment having considerable weight due to mechanical devices are mechanical inverters and altitude gain controllers which may be replaced by using the inventive concept herein.

SUMMARY OF THE INVENTION

In this invention advantage is taken of the properties of p-n junction semiconductor material to change its current and frequency characteristics proportional to stress or force applied to the material. This force or stress may be applied by fluid, electrical bias, mechanical, or electromechanical means in which the variation of the stress actuating means varies the force applied. For example, the driver-amplifier output of a prior art servosystem is applied to an electromagnetic operator of the force means on the p-n junction material to vary the current gain or frequency of the junction proportionally thereby producing the resultant of the servosystem. Accordingly, it is a general object of this invention to provide a combination of a signal responsive force applying means on a pressure-sensitive p-n junction material to vary the current and frequency characteristics of the material proportional to the signal applied to the force applying means.

BRIEF DESCRIPTION OF THE DRAWINGS

These and other objects and the attendant advantages, features, and uses will become more apparent to those skilled in the art as a more detailed description proceeds when considered along with the accompanying drawing, in which.

DESCRIPTION OF THE PREFERRED EMBODIMENT

Figure 1:
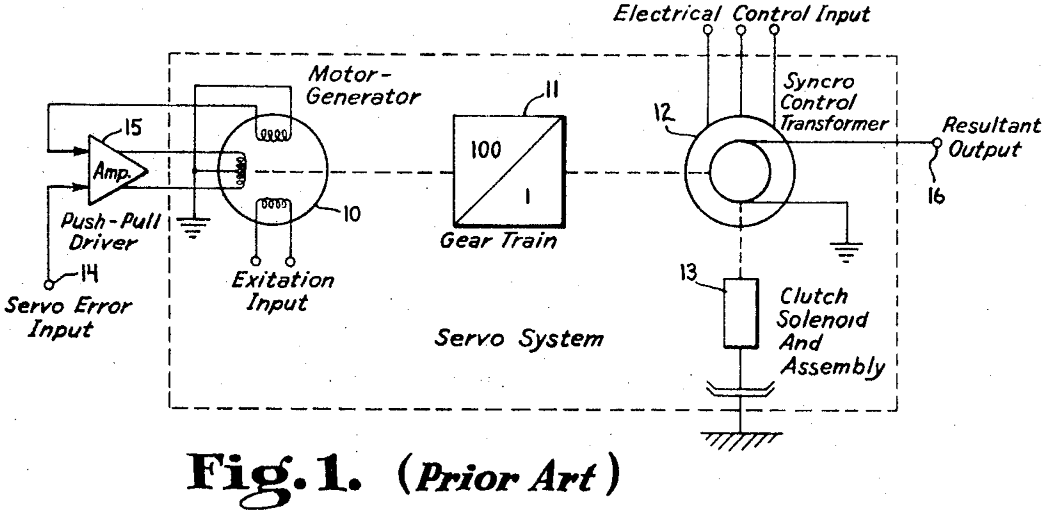
Fig. 1. (Prior Art)
FIGURE 1 illustrates in a simplified block circuit schematic diagram a prior art structure of a servosystem.

Referring more particularly to FIGURE 1, a prior art structure of a servosystem is shown in a simplified manner in which a motor-generator 10 has its rotor mechanically coupled through a reduction gear train 11 to the rotor of a synchro control transformer 12 with the rotor also mechanically coupled to a clutch solenoid and assembly 13 to dampen out overrunning oscillations. The motor generator 10 has an excitation input and the synchro control transformer 12 has an electrical control input, as well understood by those skilled in the art of servosystems. A servo error input is applied to terminal 14 through a push-pull driver amplifier 15 to a center tapped winding in the motor generator 10 and the resultant output is taken from the synchro control transformer at the output terminal 16, as well understood by those skilled in the art of the operation of such servosystems.

Figures 2, 3, 4:
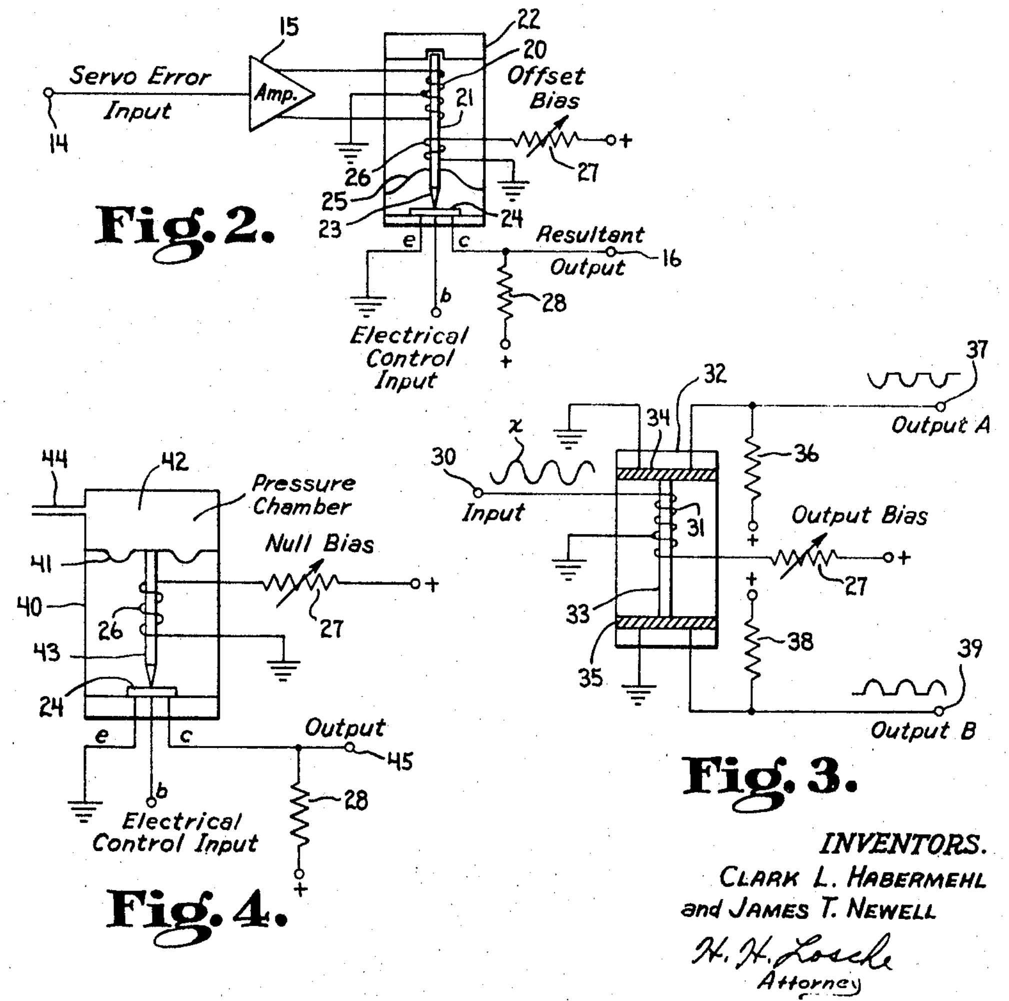
FIGURE 2 illustrates in a simplified block circuit schematic diagram a servosystem utilizing the stress-sensitive semiconductor means of this invention.
FIGURE 3 illustrates in a simplified circuit schematic and block diagram a split phase inverter device using the stress-sensitive semiconductor means of this invention.
FIGURE 4 illustrates in a simplified block circuit schematic a fluid pressure controlled stress-sensitive semiconductor device.

Referring more particularly to FIGURE 2, the prior art servosystem of FIGURE 1 may be replaced by the structure of FIGURE 2 in which the servo error input is applied to terminal 14 through a push-pull driver amplifier 15, as in FIGURE 1, the output of which is coupled to a solenoid electromagnet coil 20 center tapped to ground. The coil 20 surrounds plunger 21 that is journaled within the solenoid case 22 in any suitable manner to allow endwise movement of the plunger 21 upon the energization of the coil 20. The lower end of the plunger 21 has a point tip 23 resting on the emitter-base junction of a stress-sensitive semiconductor or transistor device 24 having emitter, base, and collector electrodes *e, b, c*. The tip 23 of the plunger 21 and the semiconductor 24 are supported in the solenoid housing 22 in any suitable manner and separated from the coil 20 by a diaphragm 25. An offset bias coil 26 also surrounds the plunger 21 and is coupled into an electrical circuit through a variable resistor 27 to null the effects of the plunger weight and other undesirable biasing on the plunger 21 to establish the proper initial pressure of the point 23 of plunger 21 on the emitter-base junction. The adjustable resistor 27 may be used to apply a predetermined pressure, such as three grams, on the emitter-base junction of transistor 24 where it is necessary to utilize the straight line function of the transistor electrical characteristics proportional to the stress applied. In some known transistors of the stress-sensitive type the direct current gain drops off slightly for about the first two or three grams of stress applied and thereafter drops rapidly in a substantially straight line function from about three to seven grams of stress applied. Accordingly, the variable resistor 27 can be used to advantage in establishing this offset bias. The emitter-collector circuit of the transistor 24 is established from a positive source through a collector load resistor 28 with the emitter grounded. The base electrode *b* may have an electrical control voltage input applied thereto to control the amplitude factor of the transistor. Any servo error input applied at terminal 14 will be amplified in the push-pull driver amplifier 15 setting up currents in the center tapped solenoid coil 20 to apply a pressure on the transistor 24 from plunger 21 proportional to this servo error input. The direct current conduction characteristics of the transistor 24 will be affected proportionally by this stress to produce a direct current resultant output on terminal 16, as in the case of FIGURE 1. Current gain ordinarily drops proportional to stress but where it is desirable to have the direct current to rise in proportion to the stress on the transistor, an inverter can be placed in this output circuit. While the solenoid case 22 is merely illustrative herein, it is to be understood that the electrical conductors extending into this case are electrically insulated and the plunger journaled and the diaphragm supported, all in the manner within the general understanding of good engineering practice for the mechanic skilled in the art and these details will not be discussed further.

Referring more particularly to FIGURE 3, an alternating signal may be applied to the input terminal 30, such as a signal *x* shown above the input conductor, to be applied to the solenoid coil 31 within the case 32. The coil 31 surrounds a plunger 33 having opposite ends abutting stress-sensitive diodes 34 and 35. Each diode is in a voltage circuit, such as 34 being in the voltage circuit from a voltage source through a resistor 36 coupled to an output terminal 37, and the voltage source coupled through the diode 35 through a resistor 38 connected to an output terminal 39. The device of FIGURE 3 will operate as a split phase inverter in which the input signal *x* will have the negative half-cycles conducted over the output A at terminal 37 while the positive-going half-cycles will be conducted on the output B at terminal 39. An offset bias is applied through one coil of the solenoid device through a variable resistor 27 in the same manner as described for the device in FIGURE 2.

Referring more particularly to FIGURE 4, a casing 40 is divided by a diaphragm 41 providing a pressure chamber 42 above the diaphragm 41 and a plunger 43 chamber below the diaphragm 41. Fluid signals may be applied to the pressure chamber 42 through a conduit means 44. The point of the plunger 43 again is applied to the emitter-base junction of a transistor 24 in like manner as described for the transistor 24 in FIGURE 2. A null bias control of offset bias is again connected through a variable resistor 27 and biasing coil 26 in the same manner as described for FIGURE 2. In this embodiment any pressure signals applied by way of the fluid conduit 44 will exert pressure through the plunger 43 to stress the emitter-base junction of transistor 24 to produce variation in its current or frequency characteristics on the output 45.

In the above modifications of this invention changes recognized in the electrical characteristics of a stress-sensitive semiconductor means, when stressed by electrical, fluid, mechanical, or other type existing signal forces, are utilized to provide an indication of the electrical change through the stress-sensitive semiconductor device proportional to the signal force. The device of FIGURE 4 for example may be used as an altitude gain controller to produce an electrical analog of atmospheric pressure changes. In like manner the electrical control input on the base *b* of the transistor 24 may be of an alternating type current of known frequency and the resultant output on 16 in FIGURE 2 or 45 of FIGURE 4 may be an indication of frequency change proportional to the input fluid, mechanical, or electrical signals.

While many modifications and changes may be made in the constructional details and features of this invention by utilizing various types of forces or stress applying means, it is to be understood that we desire to be limited in the spirit of our invention only by the scope of the appended claims.

We claim:

1. A signal transducing means comprising:
   a semiconductor having a mechanical pressure-sensitive p-n junction with electrodes on opposite sides of said junction,
   a plunger with at least one end abutting said semiconductor for transmitting mechanical pressures thereto,
   signal responsive means associated with said plunger for applying mechanical signal forces to said plunger whereby the current and frequency characteristics of said semiconductor are responsive to mechanical signals applied by the signal responsive means,
   a first electrical circuit means connected to said electrodes for supplying output current with a frequency responsive to said semiconductor, and
   electromagnetic means coupled to said plunger and an adjustable second circuit means connected to the electromagnetic means for establishing a mechanical null preset bias plunger pressure on said semiconductor independently of activation of said signal responsive means whereby the electrical current and frequency characteristics of said first circuit means are selectively adjustable while being proportional to signals received by said signal responsive means.

2. A signal transducing means as set forth in claim 1 wherein
   said semiconductor is an npn transistor having the emitter and collector in said first circuit with the collector providing said output.

3. A signal transducing means as set forth in claim 2 wherein
   said signal responsive means is an electromagnet and said signal forces activating said signal responsive means are electrical signals.

4. A signal transducing means as set forth in claim 1 wherein
   said semiconductor consists of a p-n diode abutting opposite ends of said plunger with each said diode being in a circuit whereby alternating signal force activating said signal responsive means will produce the alternate half-cycles in said diode circuits alternately.

5. A signal transducing means as set forth in claim 1 wherein
   said signal responsive means is a diaphragm actuated pressure chamber and said mechanical signal forces activating said diaphragm are fluid signals.

References Cited

UNITED STATES PATENTS

| | | | |
|---|---|---|---|
| 3,161,810 | 12/1964 | Broussard | 317—235 X |
| 3,277,405 | 10/1966 | Persson | 317—235 X |
| 3,339,085 | 8/1967 | Schmid et al. | 307—308 |

JAMES D. KALLAM, Primary Examiner

U.S. Cl. X.R.

317—234; 332—51, 52